United States Patent [19]

Kawamura

[11] Patent Number: 4,612,494
[45] Date of Patent: Sep. 16, 1986

[54] FLYWHEEL ENERGY STORAGE SYSTEM
[75] Inventor: Toshimi Kawamura, Suita, Japan
[73] Assignee: Mitsubishi Denki Kabushiki Kaisha, Tokyo, Japan
[21] Appl. No.: 691,935
[22] Filed: Jan. 16, 1985
[30] Foreign Application Priority Data
  Jan. 18, 1984 [JP] Japan .................................. 59-5788
[51] Int. Cl.⁴ .............................................. H02K 7/02
[52] U.S. Cl. ......................................... 322/4; 322/41; 310/74; 318/150; 318/161
[58] Field of Search ................. 322/4, 40, 41; 310/74; 318/150, 161

[56] References Cited
U.S. PATENT DOCUMENTS
  4,278,928 7/1981 Griffiths et al. .................. 322/40 X Primary Examiner—Patrick R. Salce
Attorney, Agent, or Firm—Leydig, Voit & Mayer, Ltd.

[57] ABSTRACT

A flywheel energy storage system comprises a dynamoelectric machine, a flywheel connected to the dynamoelectric machine for rotation therewith, an auxiliary machine for performing operational tasks associated with the operation of the dynamoelectric machine and the flywheel, a low voltage power source for operating the auxiliary machine, a permanent magnet generator connected to be operated by energy stored in the flywheel for generating electric power which is supplied to the auxiliary machine when the low-voltage power source is not available, and a converter means connected between the permanent magnet generator and the auxiliary machine for converting a varying voltage from the permanent magnet generator into a stable voltage which can be supplied to the auxiliary machine.

5 Claims, 2 Drawing Figures

FLYWHEEL ENERGY STORAGE SYSTEM

BACKGROUND OF THE INVENTION

This invention relates to a flywheel energy storage system, and more particularly to a flywheel energy storage system in which electrical energy is converted into mechanical energy by means of a dynamoelectric machine and stored in a flywheel, and in which the stored mechanical energy is taken out as electrical energy from the dynamoelectric machine.

A conventional storage system of this type is illustrated in FIG. 1. In the figure, a dynamoelectric machine 2 is connected to a flywheel 4 by a shaft 6 which is supported by a bearing 8. A magnetic bearing may be used with the bearing 8. An auxiliary machine 10 is connected to the dynamoelectric machine 2 and the bearing 8 in order to achieve smooth and continuous operation of the system. The auxiliary machine 10 typically includes a plurality of different auxiliary devices. The auxiliary machine 10 has further connected thereto a low voltage power source 12 for supplying power. Also, a mechanical brake 14 is connected to the shaft 6 for stopping the system.

With the above construction, when energy is to be stored, the dynamoelectric machine 2 is operated as an electric motor to accelerate the flywheel 4. Therefore, by inputting electric power, energy is stored as mechanical energy in the flywheel 4. On the contrary, when energy is to be taken out, the flywheel 4 is decelerated by operating the dynamoelectric machine 2 as an electric generator to release electric power to the load 18. Generally, the rotational speed of the flywheel 4 is controlled so as to be between an upper and a lower limit, and a control device 16 is inserted between power source/load 18 and the dynamoelectric machine 2. This kind of storage system is used as means for accommodating changes in load on the power line.

In order to smoothly continuously operate this storage system, certain operational tasks are required to be performed, e.g., the bearing 8 must be lubricated or electromagnetically excited, the dynamoelectric machine 2 must be cooled by air flow or other means, the environment around the flywheel 4 must be depressurized to decrease operating losses due to air resistance, feed oil must be supplied to the vacuum seal, etc. To accomplish these operational tasks associated with the operation of the dynamoelectric machine and the flywheel, a plurality of auxiliary devices are provided in an auxiliary machine 10 and an auxiliary power source is provided to power such auxiliary machine. The auxiliary power source for the auxiliary machine 10 is herein shown as electrical power from a low voltage power source 12.

Shut down of the storage system is required, for example, upon failure of the main power source and/or the auxiliary power source. Shut down of the storage system until a lower speed limit is reached can be achieved by releasing energy from the flywheel 4, but when the speed is reduced to a speed lower than the lower speed limit, the system is forced to a final shut down by dissipating the energy in a generating brake resistor within the control device or by operating the mechanical brake 14 to mechanically force the speed of the flywheel below the lower speed limit.

Since the conventional storage system is constructed as described above, when there is no surplus electrical power to be returned to the power source 18 when the storage system is in the process of being shut down, the shutting down must be achieved after the storage system is switched to the generating brake shut-down mode even below the lower speed limit, and upon power failure in the control circuit, the storage system must be shut down by the mechanical brake 14. However, since the mechanical brake 14 generally provides a braking torque by pressing a brake shoe against a drum or a disc, problems of dissipating heat and maintenance arise when the capacity of the flywheel 4 is large. Further, during power failure, the operation of the auxiliary machine 10 may often be seriously affected, providing a disadvantage that a large-capacity battery is needed. In the worst case, the storage system itself may be destroyed by the stoppage of the auxiliary machine 10.

SUMMARY OF THE INVENTION

Accordingly, one object of the present invention is to provide a flywheel energy storage system from which the above-mentioned disadvantages of the conventional design are removed.

Another object of the present invention is to provide a flywheel energy storage system reliable in operation.

With the above objects in view, the flywheel energy storage system of the present invention is provided with a permanent magnet generator in place of the conventional mechanical brake mechanism to obtain the electrical power for energizing an auxiliary machine including a lubricating device for the flywheel bearing, a cooling system for the dynamoelectric machine, and a control device when necessary, thereby allowing the system to safely and highly reliably continue or stop operation.

BRIEF DESCRIPTION OF THE DRAWINGS

The present invention will become more readily apparent from the following description of the preferred embodiment of the present invention taken in conjunction with the accompanying drawings, in which.

DESCRIPTION OF THE PREFERRED EMBODIMENT

Figure 1:
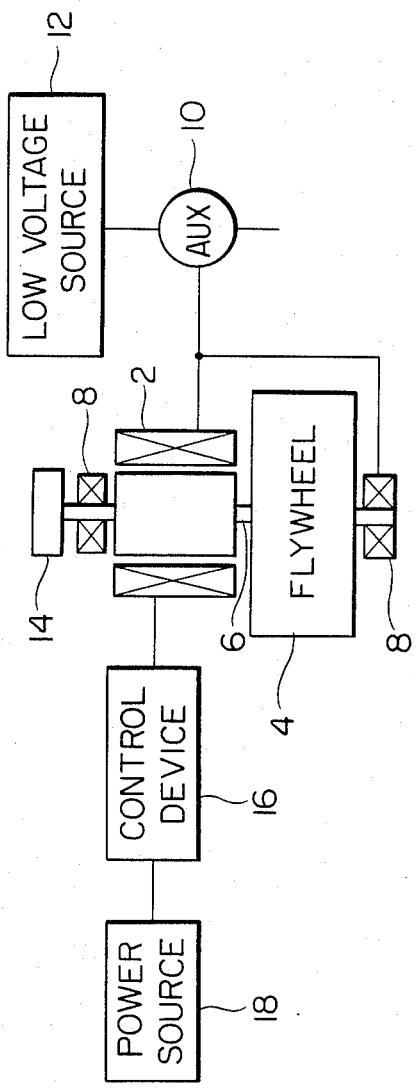
FIG. 1 is a schematic diagram of a conventional system.
Figure 2:
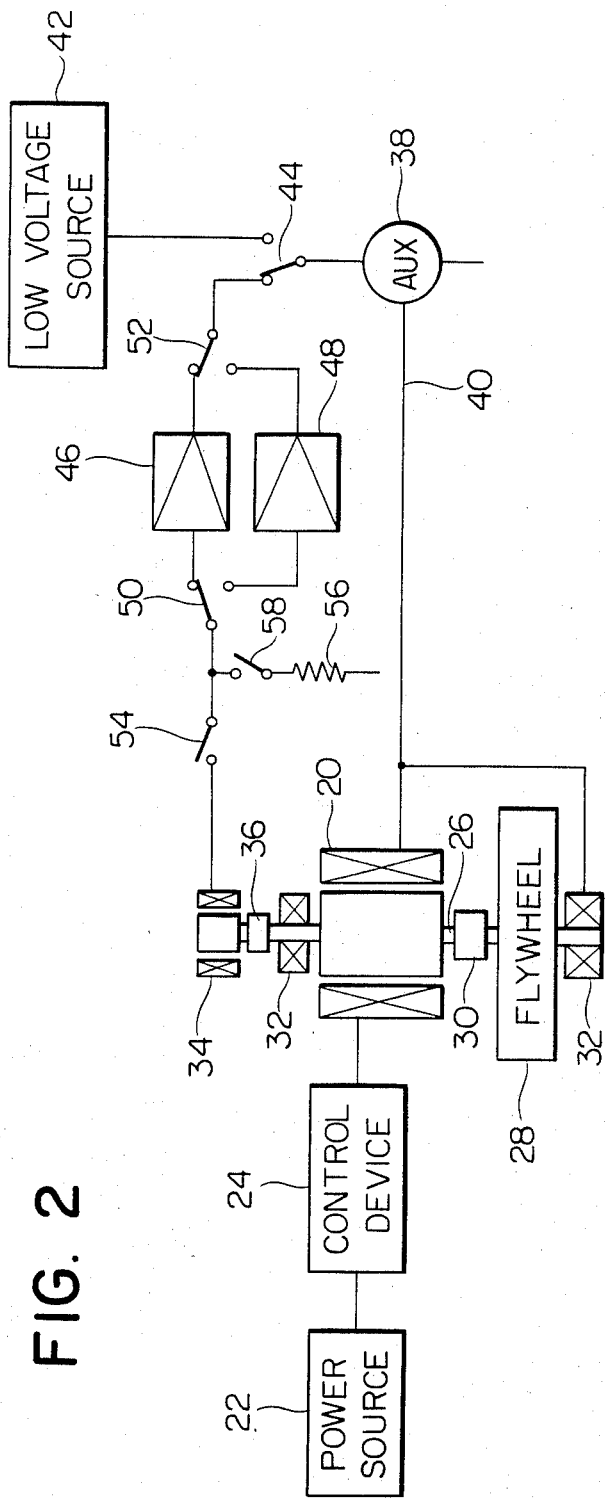
FIG. 2 is a schematic diagram of a flywheel energy storage system of the present invention.

A flywheel energy storage system of the present invention is schematically illustrated in FIG. 2. The system comprises a dynamoelectric machine 20 connected to a power source 22 or a load through a control device 24, so that the dynamoelectric machine 20 operates as an electric motor or an electric power generator. The rotating shaft 26 of the dynamoelectric machine 20 is connected to a flywheel 28 through a speed changing transmission machine 30 such as a speed changing gear unit. The extreme end of the rotating shaft 26 of the dynamoelectric machine 20 is supported by a bearing 32. The other end of the rotating shaft 26 of the dynamoelectric machine 20 is rotatably supported by another bearing 32 and has mounted at its extreme end a permanent manget generator 34. The permanent magnet generator 34 is also connected to the shaft 26 through a disconnectable coupling means 36 such as a clutch.

The flywheel energy storage system also comprises an auxiliary machine 38 including a lubricating oil supplying device, a cooling device for cooling the dynamoelectric machine 20 or the like. The auxiliary machine 38 is operatively connected through a line 40 to the dynamoelectric machine 20 and the bearing 32 in order to provide the services necessary for maintaining the efficient operation of the system. As an electric power source for operating the auxiliary machine 38 a low voltage power source 42 is connected to the auxiliary machine 38.

According to the present invention, the flywheel energy storage system further comprises an electric circuit for supplying electric power generated from the permanent magnet generator 34 to the auxiliary machine 38. This auxiliary circuit is connected between the permanent magnet generator 34 and a switch 44 between the auxiliary machine 38 and the low voltage power source 42. The auxiliary circuit includes a pair of converters 46 and 48 connected in parallel, either one of which can be selectively connected or removed from the circuit by switches 50 and 52 connected at the opposite ends of the converters 46 and 48. The converters 46 and 48 serve to provide a stable voltage to the auxiliary machine 38. A throw-in switch 54 is inserted between the permanent magnet generator 34 and the switch 50 to electrically connect power generated by the magnet generator 34 to the auxiliary machine 38. The auxiliary circuit also includes a braking resistor 56 connected in parallel with the converters 46 and 48 through a switch 58 in order to further increase the braking effort obtained by the system. Although not illustrated, the resistor 56 may be partially shunted out by any suitable means.

When the power line is properly functioning and there is surplus power which may be returned, it is possible to operate the control device 24 of the dynamoelectric machine 20 in a generator mode and therefore deceleration to the lower speed limit is possible. However, during deceleration to a much lower speed and during failure of the power sources 22 and 42 for the control apparatus 24 and the auxiliary machine 38, respectively, the previously discussed problem in shutting down the storage system upon power failure is posed. According to the present invention, such conditions are detected by suitable conventional means (not shown) and upon detecting these conditions the throw-in switch 54 of the permanent magnet generator 34 is closed to operate the converter 46 and to switch the switches 50 and 52 and the selector switch 44 into the converter side. By doing so, electric power generated by the permanent magnet generator 34, which is proportional to the rotational speed of the dynamoelectric machine 20, is converted by the converter 46 into a constant voltage and is supplied to the auxiliary machine 38. By selecting a sufficiently wide operating range for the converter 46, a speed range including a rotational speed at which the flywheel system does not need auxiliary machine operation may be included.

The converter 46 plays a very important role in this system and must be highly reliable. One measure for achieving this reliability is to use the first converter 46 at all times, and upon its failure, to replace the first converter 46 with the second converter 48 connectable through the switches 50 and 52 in parallel to the first converter 46. This double system may be called a stand-by system or a double redundant system.

The addition of the braking resistor 56 not only provides a braking force by simple means, but also provides the advantages that the power output characteristics of the permanent magnet generator 34 are improved and the demagnetization effect on the permanent magnets of the permanent magnet generator 34 is decreased, because the load characteristics are viewed from the permanent magnet generator 34 are improved and the generator is released from power factor variation and pulse operation.

As has been described, the present invention is advantageous in that the operation of the system can be safely maintained even upon the failure of the main and low voltage power sources because a permanent magnet generator is provided on the flywheel mechanism as a power source for an auxiliary machine. Further, by arranging the converter which is inserted between the permanent magnet generator and the auxiliary machine in the stand-by redundant system, the reliability is significantly increased. Also, the connection of a resistor in parallel to the converter increases the braking force and advantageously decreases the braking time.

The present invention may be applied equally well to a d.c. dynamoelectric machine, a synchronous machine, or an induction machine.

What is claimed is:

1. A flywheel energy storage system comprising:
   a dynamoelectric machine;
   a flywheel connected to said dynamoelectric machine for rotation therewith
   an auxiliary machine for performing operational tasks associated with the operation of said dynamoelectric machine and said flywheel;
   a low voltage power source for operating said auxiliary machine;
   a permanent magnet generator connected to be operated by energy stored in said flywheel for generating electric power of a varying voltage when said low-voltage power source is not available; and
   converter means connected between said permanent magnet generator and said auxiliary machine for converting said varying voltage from said permanent magnet generator into a stable voltage to provide a power supply for said auxiliary machine.

2. A flywheel energy storage system as claimed in claim 1 wherein a speed changing transmission mechanism is connected between said flywheel and said dynamoelectric machine.

3. A flywheel energy storage system as claimed in claim 1 wherein a disconnectable coupling is connected between said permanent magnet generator and said dynamoelectric machine.

4. A flywheel energy storage system as claimed in claim 1 wherein said converter means includes two converters connected in parallel for redundancy.

5. A flywheel energy storage system as claimed in claim 1 wherein a braking resistor is connected in parallel to said converter means.

* * * * *